(12) United States Patent
Rowe et al.

(10) Patent No.: US 11,258,375 B2
(45) Date of Patent: Feb. 22, 2022

(54) LOAD-BEARING VARIABLE STIFFENING DEVICE COMPRISING AN ELECTRODE STRUCTURE

(71) Applicant: Toyota Motor Engineering & Manufacturing North America, Inc., Plano, TX (US)

(72) Inventors: Michael P. Rowe, Pinckney, MI (US); Shardul S. Panwar, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 72 days.

(21) Appl. No.: 16/891,372

(22) Filed: Jun. 3, 2020

(65) Prior Publication Data
US 2021/0384846 A1    Dec. 9, 2021

(51) Int. Cl.
*H02N 1/00*    (2006.01)
(52) U.S. Cl.
CPC .................................. *H02N 1/006* (2013.01)
(58) Field of Classification Search
CPC ... H02N 1/006; B25J 9/00; B25J 9/123; B25J 9/126
See application file for complete search history.

(56) References Cited

U.S. PATENT DOCUMENTS 6,812,624 B1 * 11/2004 Pei ........................ H01L 41/113
310/309
7,167,759 B2    1/2007 Reinke et al.
(Continued)

FOREIGN PATENT DOCUMENTS

CN    209812321 U    12/2019
JP    2007097292 A    4/2007
(Continued)

OTHER PUBLICATIONS

Shane Mitchell, et al., "An Easy-To-Implement Toolkit To Create Versatile And High-Performance HASEL Actuators For Untethered Soft Robots," Journal Article, Advanced Science 6(14):1900178, Jun. 2019, URL: https://www.researchgate.net/figure/Generalized-principle-of-zipping-mode-actuation-in-HASEL-actuators-As-voltage-is_fig1_333725822, 15 pages.
(Continued)

*Primary Examiner* — Burton S Mullins
(74) *Attorney, Agent, or Firm* — Dinsmore & Shohl LLP (57) ABSTRACT

A variable stiffening device that include a first electrode structure and a second electrode structure. The first electrode structure includes an electrode extension that extends into a cavity defined between an electrode of the first electrode structure and an opposing electrode of the second electrode structure. The first and second electrode structures may be arranged in a load-bearing state by applying a voltage thereto to electrostatically attract the electrode to the opposing electrode to press the electrode extension within the cavity. Friction between the electrode extension and engaging surfaces defining the cavity prevent the electrode extension from slipping within the cavity, thereby maintaining a structural relationship among the components of the first and second electrode structures in response to an application of a load to the variable stiffening device.

20 Claims, 5 Drawing Sheets

(56) References Cited

U.S. PATENT DOCUMENTS

| | | | |
|---|---|---|---|
| 7,550,189 B1* | 6/2009 | McKnight | B32B 3/10 |
| | | | 148/563 |
| 7,598,651 B2* | 10/2009 | Kornbluh | H02N 1/006 |
| | | | 310/309 |
| 7,679,261 B2 | 3/2010 | Chappaz et al. | |
| 7,872,396 B2 | 1/2011 | Chiang et al. | |
| 7,901,524 B1* | 3/2011 | McKnight | F03G 7/065 |
| | | | 148/563 |
| 7,994,686 B2 | 8/2011 | Chiang et al. | |
| 9,078,570 B2 | 7/2015 | Parks et al. | |
| 9,164,277 B2* | 10/2015 | Conrad | H02N 1/006 |
| 9,211,690 B1* | 12/2015 | McKnight | B32B 3/14 |
| 9,790,968 B2* | 10/2017 | Yang | A61F 2/08 |
| 10,233,910 B2 | 3/2019 | Mazzeo et al. | |
| 10,457,014 B2* | 10/2019 | Corrigan | B32B 15/12 |
| 10,859,101 B2* | 12/2020 | Rowe | F15B 15/10 |
| 10,995,779 B2* | 5/2021 | Keplinger | F15B 15/10 |
| 2009/0115285 A1* | 5/2009 | Najafi | F15B 7/00 |
| | | | 310/300 |
| 2017/0333223 A1 | 11/2017 | Rasmussen et al. | |
| 2020/0130321 A1* | 4/2020 | Gandhi | B32B 3/08 |

FOREIGN PATENT DOCUMENTS

| | | |
|---|---|---|
| WO | 2019002860 A1 | 1/2019 |
| WO | 2019140209 A1 | 7/2019 |
| WO | 2019173227 A1 | 9/2019 |

OTHER PUBLICATIONS

E. Acome, et al., "Hydraulically Amplified Self-Healing Electrostatic Actuators With Muscle-Like Performance," Science Journal, Jan. 5, 2018: vol. 359, Issue 6371, pp. 61-651, Department of Mechanical Engineering & Materials Science and Engineering Program, University of Colorado, Boulder, CO 80309, USA.

* cited by examiner

LOAD-BEARING VARIABLE STIFFENING DEVICE COMPRISING AN ELECTRODE STRUCTURE

TECHNICAL FIELD

The present specification generally relates to variable stiffening devices and, more specifically, to variable stiffening devices that include electrode structures that compress electrode extensions to maintain a shape of a morphing structure.

BACKGROUND

Current variable stiffening devices use a variety of techniques to provide a device that is actuatable between a less rigid state and a more rigid state. These variable stiffening devices actuate based on the application of an external stimulus, such a temperature change or a pressure change. Some example variable stiffening devices use an external vacuum to compress layers of a device to place the device in a more rigid state. However, external vacuums require bulky equipment and operate at low efficiencies.

Accordingly, a need exists for improved variable stiffening devices that are low-profile and operate on-demand.

SUMMARY

In one embodiment, a variable stiffening device includes a first electrode structure including a first support structure and a first plurality of electrodes extending from the first support structure, the first plurality of electrodes including a first electrode and a second electrode, wherein the first electrode structure further comprises a first electrode extension extending from the second electrode. The variable stiffening device also includes a second electrode structure comprising a second support structure and a second plurality of electrodes extending from the second support structure, the second plurality of electrodes including a first opposing electrode that opposes the first electrode to form a cavity between engaging surfaces of the first electrode and the first opposing electrode. The first electrode extension extends from the second electrode into the cavity formed by the first electrode and the first opposing electrode such that, when voltage is applied to the first and second electrode structures, the first electrode extension is pinched between the first electrode and the first opposing electrode such that the first electrode extension is retained within the cavity via the engaging surfaces to maintain a structural relationship between the first and second electrodes to support the first support structure.

In another embodiment, a variable stiffening device includes a plurality of electrode pairs extending from a support structure, each of the electrode pairs comprising an electrode rotatably coupled to the support structure, an opposing electrode, and a cavity defined between engaging surfaces of the electrode and the opposing electrode. A plurality of electrode extensions, each electrode extension comprising a first end attached to a first electrode of one of the plurality of electrode pairs and a free end disposed proximate to an adjacent one of the plurality of electrode pairs. The free end of each electrode extension is inserted into the cavity defined by the adjacent one of the plurality of electrode pairs. A voltage source coupled to each of the plurality of electrode pairs. When a voltage difference supplied via the voltage source is present in each of the electrode pairs, each electrode extension is pinched in the cavity defined by the engaging surfaces of the adjacent one of the plurality of electrode pairs, and the electrode extension is retained in the cavity by the engaging surfaces to maintain a structural relationship between the plurality of electrode pairs to support the support structure in a load-bearing state.

In yet another embodiment, a method of actuating a variable stiffening device includes inserting an electrode extension of a first electrode coupled to a support structure into a cavity defined between two engaging surfaces of an electrode pair coupled to the support structure. The method also includes generating voltage using a voltage source electrically coupled to the electrode pair. The method also includes applying voltage generated by the voltage source to the electrode pair, thereby electrostatically drawing electrodes of the electrode pair together, such that a position of the electrode extension in the cavity is maintained via contact between the electrode extension and the engaging surfaces to maintain a structural relationship between the first electrode and the electrode pair in order to hold the support structure in a load-bearing position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the figures, embodiments of the present disclosure are directed to variable stiffening devices that are configurable between a non-load-bearing state and a load-bearing state by inserting electrode extensions into cavities defined between electrode structures and applying voltage to the electrode structures to pinch the electrode extensions within the cavities. In embodiments, electrodes of each of the electrode structures have opposing engaging surfaces defining the cavities, with each engaging surface having an adhering element that engages with an electrode extension that is inserted into the cavity when the voltage is applied. Friction between the electrode extensions and the adhering elements engaging the electrode extensions maintains a structural relationship between the electrodes using shear force in the electrode extensions to maintain the variable stiffness devices in the load-bearing state.

Figure 1A:
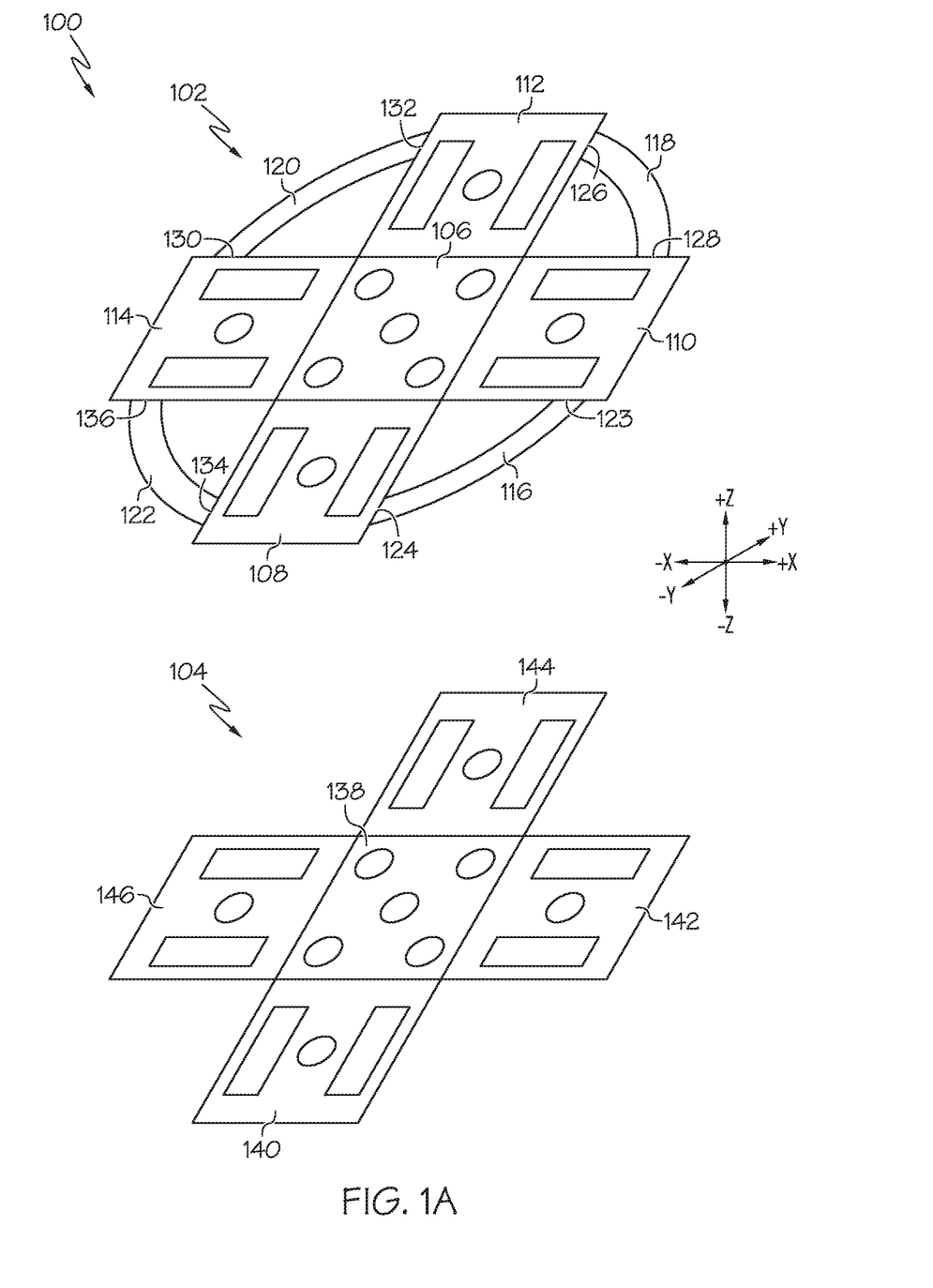
FIG. 1A depicts an exploded view of a variable stiffening device, according to one or more embodiments shown and described herein.
Figure 1B:
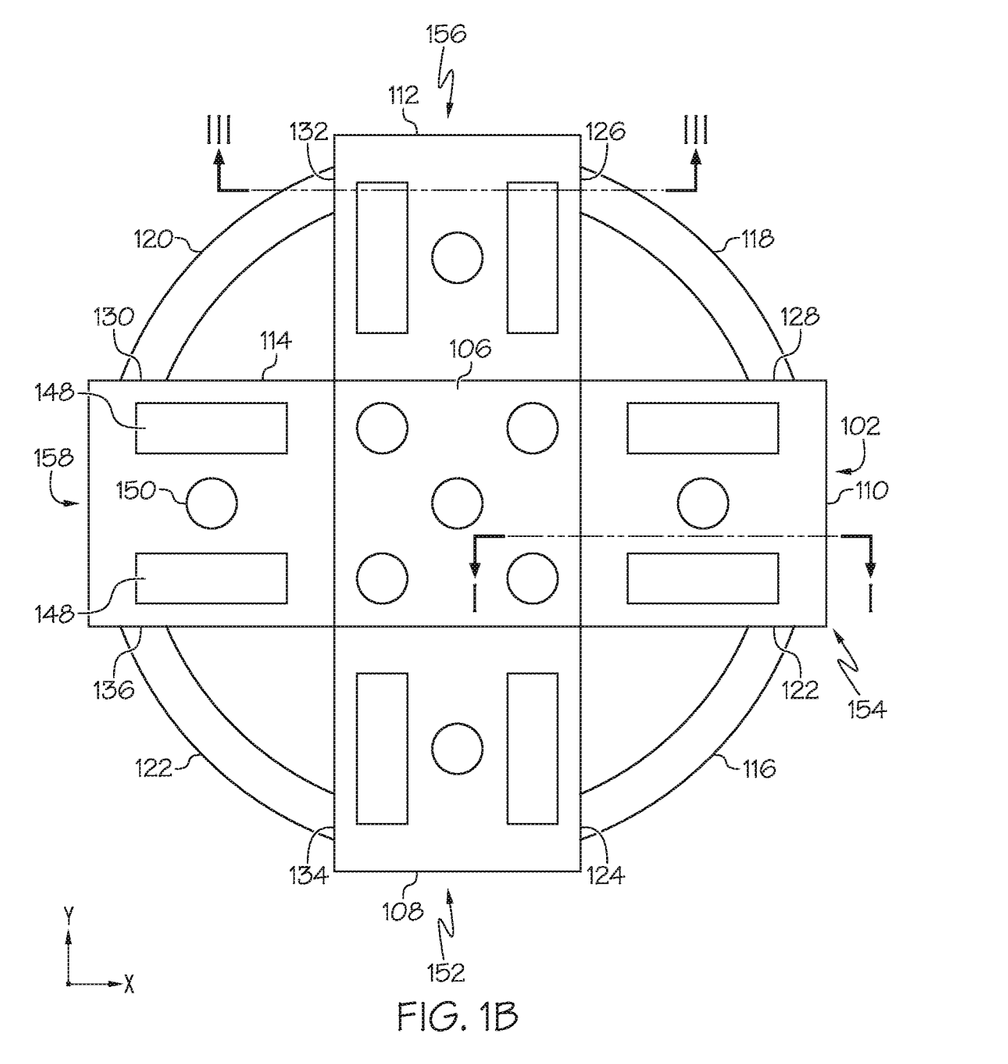
FIG. 1B depicts a top view of the variable stiffening device depicted in FIG. 1A in a non-load-bearing state, according to one or more embodiments shown and described herein.
Figure 1C:
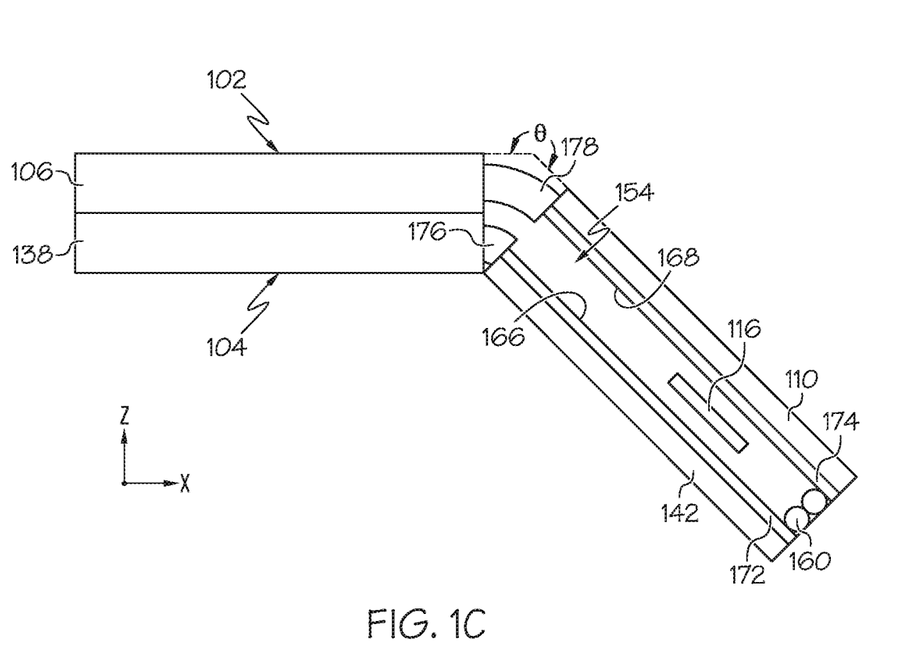
FIG. 1C schematically depicts a cross-sectional view of electrode structures of the variable stiffening device through the line I-I depicted in FIG. 1B, according to one or more embodiments shown and described herein.

Referring now to FIGS. 1A, 1B, and 1C, a variable stiffening device 100 is schematically depicted. The variable stiffening device 100 includes a first electrode structure 102 and a second electrode structure 104. As depicted in FIG. 1C, in embodiments, the first electrode structure 102 is disposed on and in contact with the second electrode structure 104. In embodiments, the first electrode structure 102 and the second electrode structure 104 are similarly sized such the first electrode structure 102 completely covers the second electrode structure 104 when the first electrode structure 102 is disposed on and aligned with the second electrode structure 104.

As depicted in FIGS. 1A and 1B, the first electrode structure 102 includes a plurality of electrodes 108, 110, 112, and 114 extending from a first support structure 106. The second electrode structure 104 includes a plurality of opposing electrodes 140, 142, 144, and 146 extending from a second support structure 138. In embodiments, plurality of electrodes 110, 112, 114, and 116 are movable relative to the first support structure 106. For example, as depicted in FIG. 1C, the electrode 110 is coupled to the first support structure 106 via a flexible joint 178 having a flexibility greater than the first support structure 106 and the electrode 110. In embodiments, the flexible joint 178 is constructed from a layer of material (e.g., the structural layer 310 described herein with respect to FIG. 3) that extends throughout an entirety of the first electrode structure 102. For example, in embodiments, the flexible joint 178 may be formed through laser patterning or ablating the layer of material such that a thickness of the layer of material within the flexible joint 178 is reduced as compared to the remainder of the first electrode structure 102 in order to provide flexibility at the flexible joint 178 to facilitate movement of the first electrode structure 102 from a non-load-bearing state to a load-bearing state, as described herein. It should be understood that the first, third, and fourth electrodes 108, 112, and 114 may be coupled to the first support structure 106 via flexible joints similar to the flexible joint 178.

In embodiments, the plurality of opposing electrodes 140, 142, 144, and 146 are also movable relative to the second support structure 138. In various embodiments, the second electrode structure 104 possesses a similar cross-sectional layer structure to that described herein with respect to the first electrode structure 102. For example, as depicted in FIG. 1C, the second electrode 142 is coupled to the second support structure 138 via a flexible joint 176 that may be similar in structure to the flexible joint 178 described herein. It should be understood that the opposing electrodes 140, 144, and 146 may be coupled to second support structure 138 via flexible joints similar to the flexible joint 176. The flexible joints 176 and 178 coupling the electrodes of the first and second electrode structures 102 and 104 to the first and second support structures 106 and 138 beneficially allow the first and second electrode structures 102 and 104 to be moved from a non-load-bearing state to a load-bearing state.

FIG. 1A depicts an exploded view of the first electrode structure 102 and the second electrode structure 104 in a non-load-bearing state. In the depicted embodiment, the first support structure 106 and the second support structure 138 are planar sheets (e.g., extending in the X-Y plane depicted in FIG. 1A). When the first electrode structure 102 is in a non-load-bearing state, the first, second, third, and fourth electrodes 108, 110, 112, and 114 are coplanar with the first support structure 106 (or extend parallel to the first support structure 106). When the second electrode structure 104 is in a non-load-bearing state, the first, second, third, and fourth opposing electrodes 140, 142, 144, and 146 are coplanar with the second support structure 138. In embodiments, when the first and second electrode structures 102 and 104 are in a non-load-bearing state, the first and second electrode structures 102 and 104 extend parallel to one another.

In embodiments, to move the first and second electrode structures 102 and 104 into a load-bearing state, the plurality of electrodes 108, 110, 112, and 114 are moved (e.g., via folding the flexible joints 178 described with respect to FIG. 1C) in a downward direction (e.g., the −Z-direction depicted in FIG. 1A) relative to the first support structure 106 such that the plurality of electrodes 108, 110, 112, and 114 are no longer coplanar to the first support structure 106, but rather extend at an angle θ to the first support structure 106 (see FIG. 1C). The plurality of opposing electrodes 140, 142, 144, and 146 may be moved relative to the second support structure 138 in a similar manner. In other words, the electrodes of the first and second electrode structures 102 and 104 are moved in unison relative to the first and second support structures 106 and 138. In the depicted embodiment, the electrodes 108, 110, 112, 140, 142, 144, and 146 of the first and second electrode structures 102 and 104 are each the same shape and arranged in a similar manner relative to the first and second support structures 106 and 138. Such a structure beneficially provides for a uniform load distribution and a balanced structure, though various alternative embodiments, where the electrodes 108, 110, 112, 140, 142, 144, and 146 may have differing sizes and directions of extension are also envisioned.

In embodiments, the first and second support structures 106 and 138 are each parallelogram-shaped (e.g., square-shaped), and the electrodes 108, 110, 112, 140, 142, 144, and 146 of the first and second electrode structures 102 and 104 are each coupled to and extend from an edge of the first support structure 106 or an edge of the second support structure 138. In embodiments, the electrodes 108, 110, 112, and 114 each possess the same dimensions (e.g., length and width) as the first support structure 106 and the electrodes 140, 142, 144, and 146 each possess the same dimensions as the second support structure 138. When so sized, the first and second electrode structures 102 and 104 may be folded into substantially cube-shaped load-bearing state, as described with respect to FIG. 2. It should be appreciated that various alternative dimensional structures are envisioned for the first and second electrode structures 102 and 104. For example, in embodiments, the electrode 110 may be sized differently from the electrode 112 such that the first support structure 106 is inclined when placed into a load-bearing state. As should be understood, the dimensions of the electrodes may be tailored to the application needing any particular orientation for the first support structure 106.

As depicted in FIG. 1A, the first electrode structure 102 includes a first electrode extension 116, a second electrode extension 118, a third electrode extension 120, and a fourth electrode extension 122. In embodiments, the first, second, third, and fourth electrode extensions 116, 118, 120, and 122 are constructed from a layer of material that also extends through the plurality of electrodes 108, 110, 112, and 114 (e.g., the electrode layer 308 described herein with respect to FIG. 3). In embodiments, each of the first, second, third, and fourth electrode extensions 116, 118, 120, and 122 includes a first end that extends directly from one of the plurality of electrodes 108, 110, 112, and 114 and a free end that is disposed proximate to an adjacent one of the plurality of electrodes 108, 110, 112, and 114. For example, the first electrode extension 116 includes a first end 124 extending from the electrode 108 (e.g., the electrode layer continuously extends from the electrode 108 into the first electrode extension 116) and a free end 123 disposed proximate to the electrode 110. The free end 123 is not directly attached to the electrode 110 but is rather movable with respect to the electrode 110. The second electrode extension 118 includes a first end 128 extending from the second electrode 110 and a free end 126 disposed proximate to the electrode 112. The third electrode extension 120 includes a first end 132 extending from the electrode 112 and a free end 130 disposed proximate to the electrode 114. The fourth electrode extension 122 includes a first end 136 extending from the electrode 114 and a free end 134 disposed proximate to the electrode 108.

The first, second, third, and fourth electrode extensions 116, 118, 120, and 122 include the free ends 123, 126, 130, and 134 that are movable relative to the first electrode structure 102 in order to facilitate adjusting the variable stiffening device 100 from the non-load-bearing state depicted in FIG. 1A to a load-bearing state. As depicted in FIGS. 1A and 1B, the first and second electrode structures 102 and 104 may be arranged relative to one another such that the plurality of electrodes 108, 110, 112, and 114 are aligned relative to the plurality of opposing electrodes 140, 142, 144, and 146. As such, the electrode 108 may be disposed on and overlap with the opposing electrode 140 to form a first cavity 152, the electrode 110 may be disposed on and overlap with the opposing electrode 142 to form a second cavity 154, the electrode 112 may be disposed on and overlap with the opposing electrode 144 to form a third cavity 156, and the electrode 114 may be disposed on and overlap with the opposing electrode 146 to form a fourth cavity 158. In embodiments, as the plurality of electrodes 108, 110, 112, and 114 and the plurality of opposing electrodes 140, 142, 144, and 146 are moved relative to the first and second support structures 106 and 138 to place the variable stiffening device 100 into the load-bearing state, each of the first, second, third, and fourth electrode extensions 116, 118, 120, and 122 are inserted into one of the first, second, third, and fourth cavities 152, 154, 156, and 158.

For example, as depicted in FIG. 1C, as the electrode 110 is folded at the flexible joint 178 such that the electrode 110 extends an angle θ relative to the first support structure 106, the first electrode extension 116 is inserted into the second cavity 154 formed between the electrode 110 and the opposing electrode 142. The second cavity 154 is formed between an engaging surface 166 of the opposing electrode 142 and an engaging surface 168 of the electrode 110. As the electrode 110 and the opposing electrode 142 are folded about the flexible joints 178 and 176, the free end 123 of the electrode extension 116 travels through the second cavity 154. Given this, the amount that the electrode 110 and opposing electrode 142 are moved (e.g., the value of the angle θ) determines the extent of the electrode extension 116 that is disposed within the second cavity 154. As depicted in FIG. 1A, the electrode extension 116 is an arced tab extending substantially entirely the distance between the electrode 108 and the electrode 110. Shaping the electrode extension 116 as an arced tab beneficially avoids the electrode extension 116 protruding from the second cavity 154 when the variable stiffening device 100 is placed into a load-bearing state. Moreover, the length of the electrode extension 116 (e.g., extending the entirety of the length between the electrode 108 and the electrode 110) beneficially maximizes the amount of the electrode extension 116 that extends into the second cavity 154, thereby maximizing contact area between the electrode extension 116 and the engaging surfaces 166 and 168.

It should be appreciated that alternative configurations for the electrode extension 116 are envisioned. For example, in embodiments, the first, second, third, and fourth electrode extensions 116, 118, 120, and 122 may not be shaped as arced tabs. For example, in embodiments, the first, second, third, and fourth electrode extensions 116, 118, 120, and 122 may comprise substantially straight linear segments extending from a first one of the plurality of electrodes 108, 110, 112, and 114 to an adjacent one of the plurality of electrodes 108, 110, 112, and 114. In embodiments first, second, third, and fourth electrode extensions 116, 118, 120, and 122 may turn or change a direction as they extend between the plurality of electrodes 108, 110, 112, and 114. In embodiments, each of the first, second, third, and fourth electrode extensions 116, 118, 120, and 122 may not extend an entirety of the distance between a pair of the plurality of electrodes 108, 110, 112, and 114, but rather extend only part of the distance between the pair. Any size or shape of the first, second, third, and fourth electrode extensions 116, 118, 120, and 122 consistent with the insertion of the electrode extensions into the cavities formed via the electrodes and opposing electrodes of the first and second electrode structures 102 and 104 may be used consistent with the present disclosure.

As depicted in FIG. 1C, the engaging surface 166 of the opposing electrode 142 includes an adhering element 172 and the engaging surface 168 of the electrode 110 includes an adhering element 174. In embodiments, the first electrode structure 102 and the second electrode structure 104 may each be attached to a voltage source (not depicted) such that the first and second electrode structures 102 and 104 receive a voltage having an opposing polarity. The opposing polarity electrostatically attracts the electrode 110 and the opposing electrode 142 such that the engaging surfaces 166 and 168 press against the first electrode extension 116 within the second cavity 154. The adhering elements 172 and 174 may engage with the first electrode extension 116 to create friction between the engaging surfaces 166 and 168 and the first electrode extension 116. Such friction may prevent the first electrode extension 116 from moving within the second cavity 154 in the presence of external forces (e.g., from a load disposed on the first support structure 106). As such, the friction supplied via the adhering elements 172 and 174 facilitates the maintenance of a structural relationship between the electrodes 108 and 110 when a voltage is applied to the first and second electrode structures 102 and 104 (e.g., when the variable stiffening device 100 is placed into a load-bearing state).

The adhering elements 172 and 174 may take a number of different forms depending on the implementation. For example, in embodiments, the adhering elements 172 and 174 are adhesive layers (e.g., the adhesive layers 326 and 328 comprising polypropylene tape and described with respect to FIG. 3) extending across the entirety of the engaging surfaces 166 and 168. In embodiments, the adhering elements 172 and 174 are abrasive elements. For example, the engaging surfaces 166 and 168 may include patterns of texture that overlap with the first electrode extension 116 and serve as the adhering elements 172 and 174. In embodiments, the first electrode extension 116 may include adhering elements (e.g., the adhesive layers 326 and 328 described with respect to FIG. 3) that engage with the adhering elements 172 and 174 when the first electrode extension 116 is squeezed within the second cavity 154 when voltage is applied to the first and second electrode structures 102 and 104.

Still referring to FIG. 1C, in embodiments, a sealing element 160 is disposed between the electrode 110 and the opposing electrode 142. The sealing element 160 may seal the second cavity 154 to prevent external debris from entering the second cavity 154 and disrupting operation of the variable stiffening device 100. The sealing element 160 may be disposed at ends of the electrode 110 and the opposing electrode 142 that are opposite to the flexible joints 178 and 176, respectively. In embodiments, the sealing element 160 comprises an adhesive element extending between the engaging surfaces 166 and 168. In embodiments, the sealing element 160 may guide the first electrode extension 116 through the second cavity 154 as the electrode extension 116 travels through the second cavity 154 when the first and second electrode structures 102 and 104 are adjusted from the non-load-bearing state depicted in FIG. 1A. In embodiments, the engaging surfaces 166 and 168 may include grooves or channels (not depicted) that are shaped in a manner that corresponds to an exterior surface of the first electrode extension 116 such that the engaging surfaces 166 and 168 guide the first electrode extension 116 through the second cavity 154.

While only the second cavity 154 between the electrode 110 and the opposing electrode 142 is described with respect to FIG. 1C, it should be appreciated that the cavities formed between other electrode pairings between the plurality of electrodes 108, 110, 112, and 114 and the plurality of opposing electrodes 140, 142, 144, and 146 may have structures similar to the second cavity 154. For example, the first cavity 152 formed between the electrode 108 and the opposing electrode 140 may receive the fourth electrode extension 122 and have a similar structure to the second cavity 154. The third cavity 156 formed between the electrode 112 and the opposing electrode 144 may receive the second electrode extension 118 and have a structure similar to the second cavity 154. The fourth cavity 158 formed between the electrode 114 and the opposing electrode 146 may receive the third electrode extension 120 and have a structure similar to the second cavity 154.

Referring to FIGS. 1A and 1B, while the first and second electrode structures 102 and 104 are described herein as each comprising four electrodes, it should be appreciated that alternative implementations are envisioned contained fewer or greater electrodes. In an example, the first electrode structure 102 may only include the electrodes 108 and 110 and the first electrode extension 116, while the second electrode structure 104 may only include one of the opposing electrodes 140 and 142 (e.g., to form a cavity for insertion of the first electrode extension 116). Moreover, each electrode of the first electrode structure 102 may not have an electrode extension extending therefrom. For example, in an embodiment, the first electrode structure 102 may only include the first electrode extension 116 and the third electrode extension 120.

In embodiments, the electrode extensions may not all be included in a single electrode structure. For example, in an embodiment, the first electrode structure 102 includes the first electrode extension 116 and the second electrode extension 118 (e.g., as described herein, the first and second electrode extensions 116 and 118 may extend directly from electrodes of the first electrode structure 102), while the second electrode structure 104 includes the third electrode extension 120 and the fourth electrode extension 122. Moreover, alternative implementations of the variable stiffening device 100 may include first and second electrode structures 102 and 104 that vary from one another in shape. For example, in embodiments, the first electrode structure 102 (and the plurality of electrodes 108, 110, 112, and 114) is sized larger than the second electrode structure 104 such that the cavities formed between the electrodes and opposing electrodes are displaced from ends of the variable stiffening device 100. Electrode structures having various size relationships, distributions of electrodes, support structure configurations, and arrangements of electrode extensions may be used consistent with the present disclosure.

Referring to FIG. 1B, in embodiments, the first and second electrode structures 102 and 104 may weight-reduction features that serve to lighten the variable stiffening device 100 and remove unnecessarily material therefrom. For example, in embodiments, the first and second support structures each include a structural layer (e.g., the structural layers 310 and 318 described herein with respect to FIG. 3) that is patterned to reduce the weight of the variable stiffening device 100. As depicted in FIG. 1B, each of the plurality of electrodes 108, 110, 112, and 114 of the first electrode structure 102 includes two elongated cavities 148 extending proximate to external edges thereof and a rounded cavity 150 disposed in a central region thereof. In contrast to the plurality of electrodes 108, 110, 112, and 114, the first support structure 106 includes a plurality of rounded cavities 150. The first support structure 106 may not include the elongated cavities 148 in order to provide rigid structural support for a load placed thereon. In embodiments, the second electrode structure 104 includes a similar set of weight-reduction features. In embodiments, neither the first electrode structure 102 nor the second electrode structure 104 includes weight reduction-features to provide maximum structural support. As will be appreciated, the number and arrangement of weight-reduction features incorporated into the variable stiffening device 100 may depend on a desired load-bearing capacity, the materials used to construct the first and second electrode structures 102 and 104, the size and arrangement of the first and second electrode structures 102 and 104 and the voltage to be applied to the first and second electrode structure 102 and 104. As such, any number and arrangement of weight-reduction features may be incorporated into the variable stiffening device 100 consistent with the present disclosure.

Figure 2:
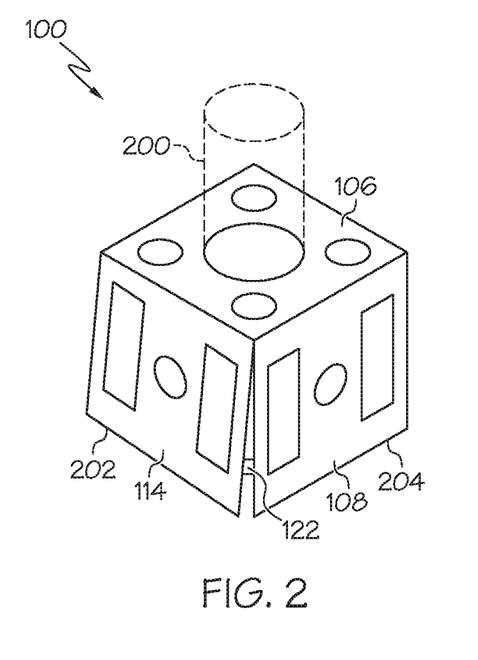
FIG. 2 depicts a perspective view of the variable stiffening device depicted in FIG. 1A in a load-bearing state, according to one or more embodiments described herein.

Referring now to FIG. 2, a perspective view of the variable stiffening device 100 in a load-bearing state is depicted. The electrodes 108 and 114 are folded (e.g., about flexible joints similar to the flexible joints 178 described herein with respect to FIG. 1C) such that the electrodes 108 and 114 are approximately perpendicular (e.g., the angle θ described with respect to FIG. 1C is from about 80 degrees to about 100 degrees) to the first support structure 106. In embodiments, a supporting end 202 of the electrode 114 and a supporting end 204 of the electrode 108 are disposed on a surface (e.g., a table, the ground, or any support). In the angular configuration depicted, the electrodes 108 and 114 support the first support structure 106 in a position above the surface in a load-bearing state.

The fourth electrode extension 122 extends behind the electrode 108 into the first cavity 152 depicted in FIG. 1B formed between the electrode 108 and the opposing electrode 140. As described herein, the electrode 108 and the opposing electrode 140 may include engaging surfaces that define the first cavity 152 and include adhering elements that engage the fourth electrode extension 122 when a voltage from a voltage source is supplied the variable stiffening device 100. For example, voltages of opposing polarity may be applied to the first and second electrode structures 102 and 104 to cause electrostatic attraction between the electrode 108 and the opposing electrode 140, thereby causing the engaging surfaces defining the cavity to engage with the fourth electrode extension 122 at the adhering elements. Friction between the fourth electrode extension 122 and the adhering elements maintains the positioning of the fourth electrode extension 122 within the first cavity 152 and causes a structural relationship between the electrode 108 and the electrode 114 to be maintained such that the first support structure 106 remains supported via the supporting ends 202 and 204. It should be appreciated that the first, second, and third electrode extensions 116, 118, and 118 may be held in cavities defined by electrode pairings of the first and second electrode structures 102 and 104 in a similar manner to hold the variable stiffening device 100 in the load-bearing state.

As depicted in FIG. 2, a load 200 is disposed on the first support structure 106. In embodiments, the friction between the first, second, third, and fourth electrode extensions 116, 118, 120, and 122 and the engaging surfaces defining the cavities in which the electrode extensions are disposed is sufficient to prevent the first, second, third, and fourth electrode extensions 116, 118, 120, and 122 from slipping even when the load 200 is disposed on the first support structure 106. In one example, the variable stiffening device 100 was constructed to weigh about 20 grams and was capable of maintaining the load-bearing state using a 10 kV voltage even when a load 200 of approximately 1 kg was disposed on the first support structure 106. As such, in this example, the variable stiffening device 100 is capable of holding at least approximately 50 times its own weight.

Figure 3:
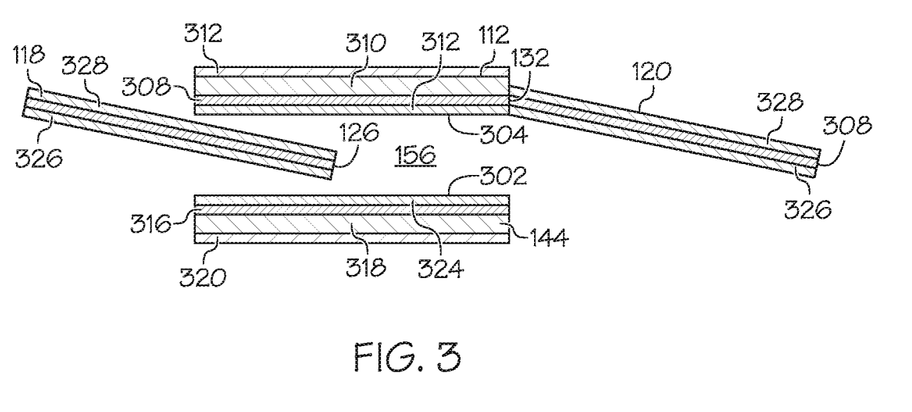
FIG. 3 depicts a cross-sectional view of electrode structures of the variable stiffening device through the line III-III depicted in FIG. 1B, according to one or more embodiments described herein.

FIG. 3 depicts an example cross-sectional view of the variable stiffening device at the line III-III depicted in FIG. 1B. In an embodiment, the cross-sectional view depicted in FIG. 3 is of the variable stiffening device 100 in the non-load-bearing state described with respect to FIGS. 1A and 1B. As such, the first electrode structure 102 may extend in a first plane, while the second electrode structure 104 may extend in a second plane (e.g., the angle θ described with respect to FIG. 1C may be approximately 0 degrees).

FIG. 3 depicts a cross-sectional view of the third cavity 156 formed between the electrode 112 of the first electrode structure 102 and the opposing electrode 144 of the second electrode structure 104. The electrode 112 includes an electrode layer 308, a structural layer 310, a protection layer 312, and an adhesive layer 314. The electrode layer 308 may be a layer of conductive material adapted to receive a voltage from a voltage source. In embodiments, the electrode layer 308 is constructed of Mylar (e.g., biaxially-oriented polyethylene terephthalate) coated with aluminum. Mylar beneficially provides relatively high tensile strength and dimensional stability. As depicted in FIG. 3, the electrode layer 308 extends from the electrode 112 into the electrode extension 120 via the first end 132. The Mylar provides tensile strength to the third electrode extension 120 such that the third electrode extension 120 does not break when the variable stiffening device 100 is placed in the load-bearing state described herein. In embodiments, the electrode layer 308 extends throughout the entirety of the first electrode structure 102 described herein.

The structural layer 310 provides structural support to the electrode layer 308 such that the variable stiffening device 100 may maintain a structure despite relatively heavy loads being applied thereto. In embodiments, the structural layer 310 is disposed in direct contact with the electrode layer 308. The structural layer 310 may include polycarbonate for durability, strength, and formability. In the example depicted, the structural layer 310 does not extend into the third electrode extension 120 to enhance the flexibility of the third electrode extension 120 to be guided into the fourth cavity 158 described herein with respect to FIG. 1B. The protection layer 312 may provide environmental resistance (e.g., moisture resistance) and fatigue resistance to the structural layer 310. In embodiments, the protection layer 312 is constructed of biaxially oriented polypropylene (BOPP). The adhesive layer 314 is disposed on a side of the electrode layer 308 opposite to the structural layer 310. The adhesive layer 314 defines an engaging surface 304 that delineates a side of the third cavity 156. In embodiments, the adhesive layer 314 is constructed of BOPP tape and acrylic adhesive to provide an adhering element that engages with the second electrode extension 118.

The opposing electrode 144 includes an electrode layer 316, a structural layer 318, a protection layer 320, and an adhesive layer 322. In embodiments, the opposing electrode 144 has a structure similar to the electrode 112. As depicted, the electrode layers 306 and 316 are arranged such that the adhesive layers 312 and 322 are the only material that separates the electrode layers 306 and 316. Such an arrangement provides for a minimal distance of separation between the electrode layers 306 and 316 when they are attracted to and contact one another responsive to a voltage being applied to the variable stiffening device 100. Such minimal distance maximizes the attractive force between the electrode 112 and the opposing electrode 144, thereby maximizing the resistance to the second electrode extension 118 slipping from the third cavity 156 when the variable stiffening device is placed in a load-bearing state.

The free end 126 of the second electrode extension 118 is shown to be disposed in the third cavity 156. In embodiments, as the positioning of the electrode 112 and opposing electrode 144 are adjusted, the free end 126 is inserted further into the cavity 156 to increase an amount of overlap between the second electrode extension 118 and engaging surfaces 302 and 304 of the electrode 112 and opposing electrode 144. Once a voltage is applied to the variable stiffening device 100, the electrode 112 is electrostatically attracted to the opposing electrode 144 such that the second electrode extension 118 is pressed against both of the engaging surfaces 302 and 304. The adhesive in the adhesive layers 312 and 322 provides friction to prevent the second electrode extension 118 from sliding within the third cavity 156 when the voltage is applied.

In the example depicted, the second electrode extension 118 and the third electrode extension 120 both include adhesive layers 326 and 328 disposed on either side of the electrode layer 308. In embodiments, the adhesive layers 326 and 328 are constructed of BOPP tape with acrylic adhesive. The adhesive layers 326 and 328 increase the friction between the second electrode extension 118 and the engaging surfaces 302 and 304 to beneficially increase the strength of the variable stiffening device 100 when placed into the load-bearing state described herein. The adhesive layer 326 may be applied to the electrode layer 308 at the same time as the adhesive layer 312.

It should now be understood that embodiments described herein are directed to variable stiffening devices that include a first electrode structure and a second electrode structure. The first electrode structure comprises an electrode extension that extends into a cavity defined between an electrode of the first electrode structure and an opposing electrode of the second electrode structure. The first and second electrode structures may be arranged in a load-bearing state by applying a voltage thereto to electrostatically attract the electrode to the opposing electrode to press the electrode extension within the cavity. Friction between the electrode extension and engaging surfaces defining the cavity prevent the electrode extension from slipping within the cavity, thereby maintaining a structural relationship among the components of the first and second electrode structures in response to an application of a load to the variable stiffening device.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A variable stiffening device comprising:
   a first electrode structure comprising a first support structure and a first plurality of electrodes extending from the first support structure, the first plurality of electrodes including a first electrode and a second electrode, wherein the first electrode structure further comprises a first electrode extension extending from the second electrode; and
   a second electrode structure comprising a second support structure and a second plurality of electrodes extending from the second support structure, the second plurality of electrodes including a first opposing electrode that opposes the first electrode to form a cavity between engaging surfaces of the first electrode and the first opposing electrode, wherein:
   the first electrode extension extends from the second electrode into the cavity formed by the first electrode and the first opposing electrode such that, when voltage is applied to the first and second electrode structures, the first electrode extension is pinched between the first electrode and the first opposing electrode such that the first electrode extension is retained within the cavity via the engaging surfaces to maintain a structural relationship between the first and second electrodes to support the first support structure.

2. The variable stiffening device of claim 1, wherein the first and second support structures comprise planar sheets, wherein, when the first and second electrode structures are in a non-load-bearing state, the first plurality of electrodes are co-planar with the first support structure and the second plurality of electrodes are co-planar with the second support structure.

3. The variable stiffening device of claim 2, wherein, when the first and second electrode structures are in a load-bearing state, the first and second pluralities of electrodes are angled relative to the first and second support structures such that supporting ends of the first and second pluralities of electrodes support the first and second support structures in a load-bearing position.

4. The variable stiffening device of claim 1, wherein the first support structure is disposed on the second support structure such that the first plurality of electrodes is aligned with the second plurality of electrodes.

5. The variable stiffening device of claim 4, wherein:
   the first plurality of electrodes further comprises a third electrode and a fourth electrode extending from the first support structure;
   the second plurality of electrodes further comprises a second opposing electrode, a third opposing electrode, and a fourth opposing electrode extending from the second support structure;
   the first electrode and the first opposing electrode are aligned with one another to form a first cavity between engaging surfaces of the first electrode and the first opposing electrode;
   the second electrode and the second opposing electrode are aligned with one another to form a second cavity between engaging surfaces of the second electrode and the second opposing electrode;
   the third electrode and the third opposing electrode are aligned with one another to form a third cavity between engaging surfaces of the third electrode and the third opposing electrode; and
   the fourth electrode and the fourth opposing electrode are aligned with one another to form a fourth cavity between engaging surfaces of the fourth electrode and the fourth opposing electrode.

6. The variable stiffening device of claim 5, wherein:
   the first electrode structure further comprises a second electrode extension extending from the first electrode that is inserted into the fourth cavity, a third electrode extension extending from the fourth electrode and inserted into the third cavity, and a fourth electrode extension extending from the second electrode into the second cavity; and
   when voltage is applied to the first and second electrode structures, the first electrode extension is pinched and retained within the first cavity, the second electrode extension is pinched and retained within the fourth cavity, the third electrode extension is pinched and retained within the third cavity, and the fourth electrode extension is pinched and retained within the second cavity.

7. The variable stiffening device of claim 4, wherein the variable stiffening device maintains a cube-like shape when voltage is applied to the first and second electrode structures and a load is placed on the first support structure or the second support structure.

8. The variable stiffening device of claim 1, wherein the first electrode structure comprises a first layer of electrode material and the second electrode structure comprises a second layer of electrode material.

9. The variable stiffening device of claim 8, wherein the first and second layers of electrode material comprise aluminum-coated biaxially-oriented polyethylene terephthalate.

10. The variable stiffening device of claim 8, wherein the first and second layers of electrode material continuously extend throughout entireties of the first and second electrode structures.

11. The variable stiffening device of claim 8, wherein the first electrode structure comprises a first structural layer that supports the first layer of electrode material and the second electrode structure comprises a second structural layer the supports the second layer of electrode material.

12. The variable stiffening device of claim 11, wherein the first structural layer comprises flexible joints between the first support structure and the first plurality of electrodes and the second structural layer comprises flexible joints between the second support structure and the second plurality of electrodes.

13. The variable stiffening device of claim 1, wherein the engaging surfaces comprise adhesive layers disposed on the first electrode and the first opposing electrode.

14. A variable stiffening device comprising:
a plurality of electrode pairs extending from a support structure, each of the electrode pairs comprising an electrode rotatably coupled to the support structure, an opposing electrode, and a cavity defined between engaging surfaces of the electrode and the opposing electrode;
a plurality of electrode extensions, wherein each electrode extension of the plurality of electrode extensions comprises a first end attached to a first electrode of one of the plurality of electrode pairs and a free end disposed proximate to an adjacent one of the plurality of electrode pairs, wherein the free end of each electrode extension is inserted into the cavity defined by the adjacent one of the plurality of electrode pairs; and
a voltage source coupled to each of the plurality of electrode pairs, wherein when a voltage difference supplied via the voltage source is present in each of the electrode pairs, each electrode extension is pinched in the cavity defined by the engaging surfaces of the adjacent one of the plurality of electrode pairs, and the electrode extension is retained in the cavity by the engaging surfaces to maintain a structural relationship between the plurality of electrode pairs to support the support structure in a load-bearing state.

15. The variable stiffening device of claim 14, wherein:
the electrodes of the plurality of electrode pairs are rotatably coupled to a first portion of the support structure via flexible joints formed in a structural support layer than extends throughout an entirety of the first portion of the support structure and each one of the electrodes of the plurality of electrode pairs; and
the opposing electrodes of the plurality of electrode pairs are rotatably coupled to a second portion of the support structure that is attached to an underside surface of the first portion of the support structure.

16. The variable stiffening device of claim 14, wherein the support structure is a parallelogram and each of the plurality of electrode pairs extends from an edge of the support structure such that, when the support structure is placed in a load-bearing position, the variable stiffening device is substantially parallelepiped-shaped and the support structure defines a load-bearing surface for supporting a load that is at least approximately 50 times a weight of the variable stiffening device.

17. The variable stiffening device of claim 14, wherein the engaging surfaces defining each cavity comprise adhering elements that engage with one of the plurality of electrode extensions to retain that electrode extension in that cavity.

18. A method of actuating a variable stiffening device, the method comprising:
inserting an electrode extension of a first electrode coupled to a support structure into a cavity defined between two engaging surfaces of an electrode pair coupled to the support structure;
generating voltage using a voltage source electrically coupled to the electrode pair; and
applying voltage generated by the voltage source to the electrode pair, thereby electrostatically drawing electrodes of the electrode pair together, such that a position of the electrode extension in the cavity is maintained via contact between the electrode extension the engaging surfaces to maintain a structural relationship between the first electrode and the electrode pair in order to hold the support structure in a load-bearing position.

19. The method of claim 18, further comprising moving the first electrode and the electrode pair from a non-load-bearing state by rotating the first electrode and the electrode pair about flexible joints formed between the first electrode and the electrode pair and the support structure while inserting the electrode extension into the cavity.

20. The method of claim 18, wherein the engaging surfaces comprise adhering elements that engage with the electrode extension to maintain the position of the electrode extension in the cavity.

* * * * *